United States Patent
Minnick (10) Patent No.: US 7,409,542 B2
(45) Date of Patent: Aug. 5, 2008

(54) SECURITY ASSOCIATION MANAGEMENT THROUGH THE USE OF LOOKUP TABLES

(75) Inventor: Linden Minnick, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1343 days.

(21) Appl. No.: 09/965,579

(22) Filed: Sep. 26, 2001

(65) Prior Publication Data

US 2003/0061495 A1 Mar. 27, 2003

(51) Int. Cl.
*H04L 9/00* (2006.01)
*H04K 1/00* (2006.01)

(52) U.S. Cl. .................. 713/153; 713/189
(58) Field of Classification Search ............ 713/200, 713/201, 153, 189
See application file for complete search history.

(56) References Cited

U.S. PATENT DOCUMENTS

| | | | | |
|---|---|---|---|---|
| 6,061,679 | A * | 5/2000 | Bournas et al. ............ | 707/3 |
| 6,347,376 | B1 * | 2/2002 | Attwood et al. ............ | 713/201 |
| 6,460,122 | B1 * | 10/2002 | Otterness et al. .......... | 711/154 |
| 6,505,192 | B1 * | 1/2003 | Godwin et al. ............ | 707/3 |
| 6,711,562 | B1 * | 3/2004 | Ross et al. ................ | 707/3 |
| 6,763,394 | B2 * | 7/2004 | Tuck, III et al. .......... | 709/238 |
| 7,194,766 | B2 * | 3/2007 | Noehring et al. .......... | 726/13 |

FOREIGN PATENT DOCUMENTS

JP 03164866 A * 7/1991

OTHER PUBLICATIONS

Apparna, R. et al., "Monitoring Ethernet Network activity with NDIS drivers," Nov. 22, 1999, pp. 1-2. <http://www.cswl.com/whiteppr/white/ethernet.html>.*

* cited by examiner

*Primary Examiner*—Emmanuel L Moise
*Assistant Examiner*—Michael Pyzocha
(74) *Attorney, Agent, or Firm*—Blakely, Sokoloff, Taylor & Zafman LLP (57) ABSTRACT

Methods and apparatuses for managing tables of security associations (SA) are described. A device driver operating in an environment, for example, NDIS, where a unique handle is selected for each transmit SA and the SPI for each receive SA is selected with a random algorithm, divides transmit SAs from receive SAs in separate tables. An SA lookup table having a whole binary number of entries that is the lowest binary number greater than five times the number of SAs supported by the device driver contains information to match an SA to a data packet, and locate the SA in memory. The lookup table is searched using a bit-wise AND hash function.

30 Claims, 6 Drawing Sheets

SECURITY ASSOCIATION MANAGEMENT THROUGH THE USE OF LOOKUP TABLES

FIELD OF THE INVENTION

The invention relates to processing of cryptography information. More specifically, the invention relates to techniques for storing and searching tables of cryptography information.

BACKGROUND OF THE INVENTION

The IP (Internet Protocol) Security (IPsec) standard, IP Security Internet Engineering Task Force (IETF) Request for Comments (RFC) 2401, published November 1998, is one method of protecting both the confidentiality and integrity of data transferred on a network. Cryptographic (crypto) information is contained in a data structure called a Security Association (SA). The information indicates to electronic systems utilizing IPsec how to perform crypto operations (e.g., encryption, decryption, authentication) on packets of network data. The crypto operations may be offloaded, where the packets of data are processed in hardware external to the system processor, to improve system performance.

A device driver is associated with the network interface hardware that couples the network traffic streams to an electronic system. The device driver that supports IPsec offload manages the SAs. For example, in a Network Driver Interface Specification (NDIS) environment, the miniport driver manages the SAs. In certain environments, the number of SAs to be managed can be very large. For example, in a server environment the number can reach many thousands. The driver maintains a pair of SAs for each connection, one for transmit and one for receive.

When a device driver receives a packet of network data in an environment supporting IPsec offload, the driver parses the packet to match the packet to its corresponding SA. The device driver searches an internal database of SAs to find which SA has a matching tuple. The IPsec standard specifies that the tuple uniquely identifies the SA for a data packet. However, in some IPSec implementations, such as the operating systems available from Microsoft Corporation, the receive SPI is guaranteed to be unique across the entire system. In this case, the SPI alone is sufficient to search for the SA, though the remaining members of the tuple must be verified as well.

In traditional NDIS implementations, the miniport driver maintains all SAs in one table. When the miniport needs to search the table for either transmit or receive packets, the miniport driver performs a linear search. This traditional approach has several inefficiencies. One shortfall is that a miniport driver searches receive SAs for transmit packets, and transmit SAs for receive packets. There is no chance of a match in either case. Another shortfall is that linear searches are inherently inefficient compared to other search algorithms, for example, binary searches.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for managing tables of cryptography (crypto) information are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification do not all necessarily refer to the same embodiment. Likewise, the appearances of the phrase "in another embodiment," or "in an alternate embodiment" appearing in various places throughout the specification do not all necessarily refer to the same embodiment.

Techniques for managing tables of crypto information, such as Security Associations (SAs), necessary to perform crypto operations (e.g., encryption, decryption, authentication) on secure traffic data packets are described. In an environment where a unique identifier is selected for each transmit SA, and each receive SA is identified by an identifier chosen by a random algorithm, a device driver separates transmit and receive SAs in separate tables. For example, this could be a miniport driver in an NDIS environment. An SA lookup table is used as a hash table to provide a search that is more efficient than a traditional linear search algorithm. In one embodiment, the hash function is a bit-wise AND.

Figure 1:
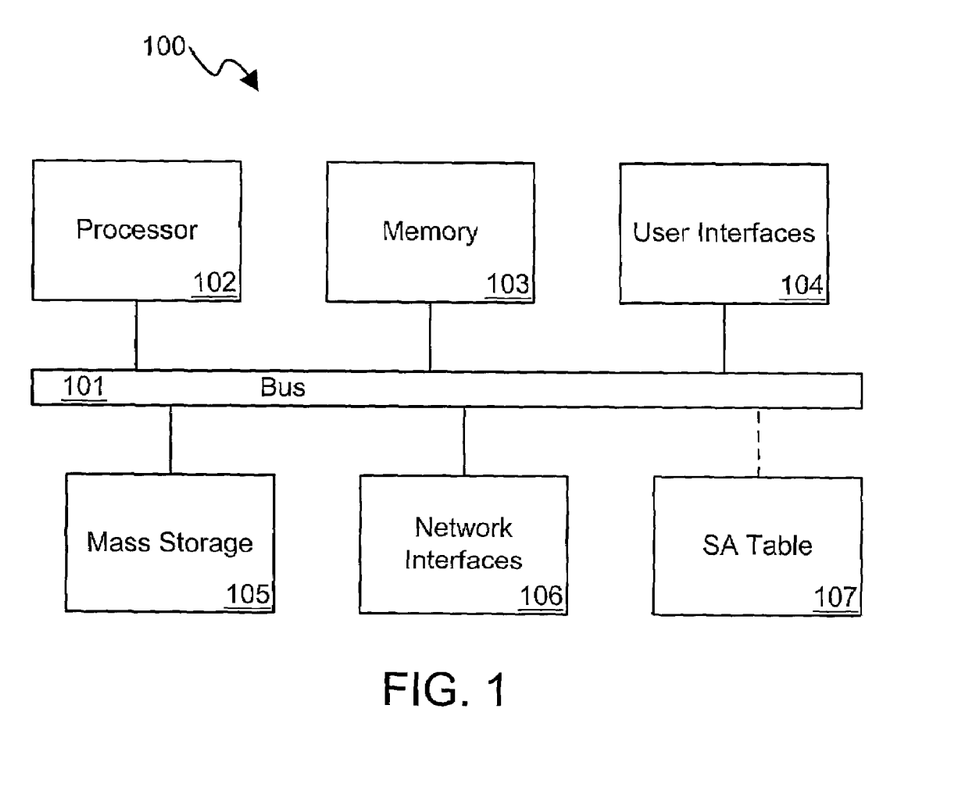
FIG. 1 is one embodiment of a block diagram of an electronic system.

FIG. 1 is one embodiment of an electronic system. Electronic system 100 may be, for example, a computer, a Personal Digital Assistant (PDA), a set top box, or other electronic system. System 100 includes bus 101 or other communication device to communicate information, and processor 102 coupled with bus 101 to process information and to execute instructions. System 100 further includes memory 103, coupled to bus 101 to store information and instructions to be executed by processor 102. Memory 103 may also be used to store temporary variables or other intermediate information during execution of instructions by processor 102. Memory 103 may include random access memory (RAM), read-only memory (ROM), flash, or other static or dynamic storage media.

Instructions can be provided to memory 103 from a storage device, such as magnetic disk, CD-ROM, DVD, via a remote connection (e.g., over a network), etc. In alternate embodiments, hard-wired circuitry can be used in place of or in combination with software instructions to enable system 100 to use lookup tables for managing SAs as described below. Thus, the electronic system depicted above is not limited to any specific combination of hardware circuitry and software structure.

Instructions can be provided to memory 103 from a form of machine-accessible medium. A machine-accessible medium includes any mechanism that provides (i.e., stores and/or transmits) information in a form readable by a machine (e.g., a computer). For example, a machine-accessible medium includes: read only memory (ROM); random access memory (RAM); magnetic disk storage media; optical storage media; flash memory devices; electrical, optical, acoustical or other form of propagated signals (e.g., carrier waves, infrared signals, digital signals); etc.

User interfaces 104 are coupled to bus 101 to allow interaction with a user. User interfaces 104 can be, for example, input devices (e.g., mouse, keyboard, touchpad, etc.) and/or output devices (e.g., cathode ray tube (CRT) monitor, liquid crystal display (LCD), etc.). Mass storage 105 can be coupled to system 100 to provide instructions to memory 103. Mass storage 105 can be, for example, a magnetic disk or optical disc and its corresponding drive, a memory card, or another device capable of storing machine-readable instructions. Network interfaces 106 can be coupled to bus 101 to enable system 100 to communicate with other electronic systems via a network.

Network interfaces 106 couple electronic system 100 to other electronic systems over a network. In one embodiment, secure traffic streams are transmitted and/or received by system 100 through network interfaces 106. Crypto operations are applied to encrypt secure traffic data packets prior to transmitting the packets through traffic streams over a network. Crypto operations are applied to secure data packets to authenticate and/or decrypt data packets received from secure traffic streams from a network.

The crypto operations can be performed by network interfaces 106, through hardware offload processing. In offloading, hardware external to processor 102, for example, a processor on network interfaces 106, performs crypto operations on data packets. A device driver is associated with network interfaces 106 to integrate the hardware and software functions of network interfaces 106 into system 100. The device driver associated with network interfaces 106 can, for example, direct network interfaces 106 to encrypt a data packet created by system 100 for transmission. A device driver can be, for example, a software driver agent incorporated from a series of machine-readable instructions stored within memory 103.

SA table 107 may be coupled to system 100 to provide a hardware implementation of a data structure of SAs. SA table 107 may be an Application Specific Integrated Circuit (ASIC), a programmable logic device (PLD), or other hardware device to provide a hardware implementation of a data structure of SAs. It is possible for SA table 107 to be stored remotely from electronic system 100. SA table 107 is not a necessary part of system 100.

Figure 2:
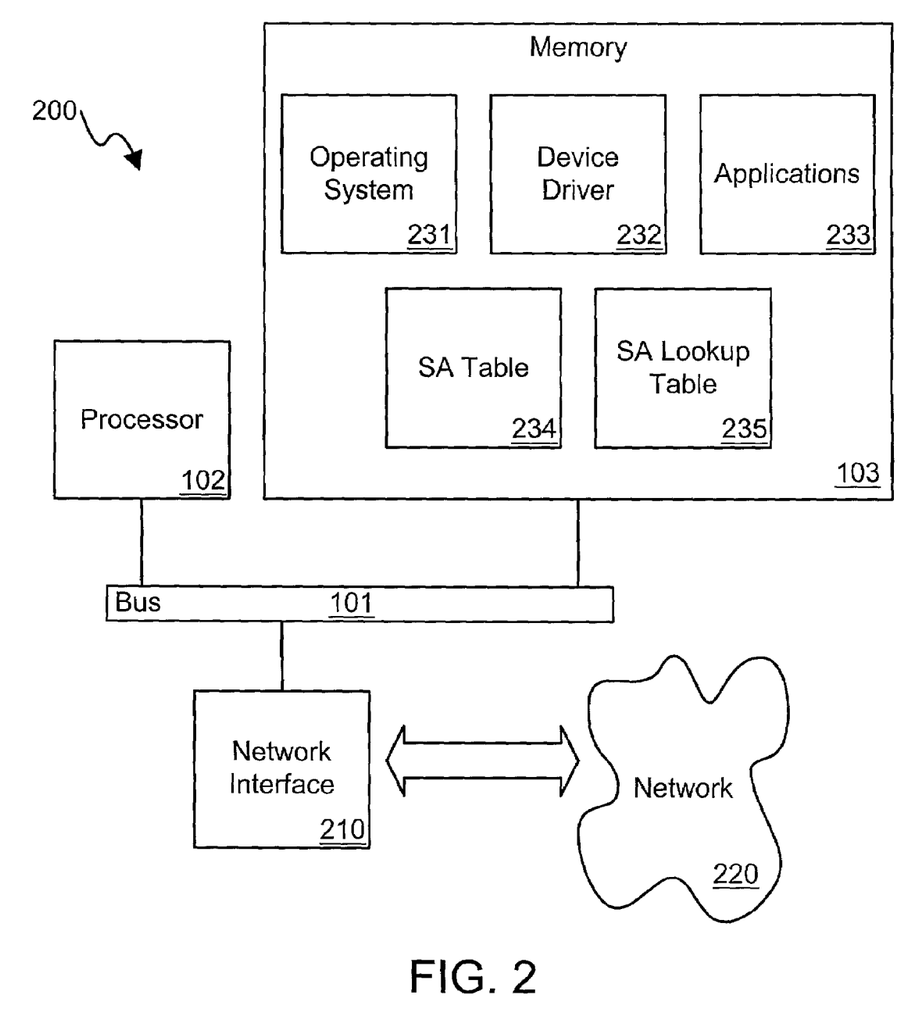
FIG. 2 is one embodiment of a block diagram of an electronic system coupled to a network through a network interface.

FIG. 2 is one embodiment of a block diagram of an electronic system coupled to a network through a network interface. Network Interface (NI) 210 is a communication interface that enables system 200 to communicate to other electronic systems coupled to network 220. For example, NI 210 can be a network interface card (NIC). In one embodiment, secure traffic data packets are received from network 220 into NI 210. Similarly, secure traffic data packets can be transmitted to network 220 from NI 210.

Memory 103 contains operating system (OS) 231, which directs operations of system 200. In one embodiment, OS 231 is the highest layer of control of system 200. Device driver 232 and applications 233 are other layers of system control, and direct operation within their allowable context of system control. Applications 233 can contain programs of a higher layer of control than device driver 232. Applications 233 may also contain other programs (e.g., word processor(s), electronic mail (e-mail) programs). In one embodiment, OS 231 contains a communication protocol layer, such as Transmission Control Protocol (TCP)/Internet Protocol (IP) stack, which creates network packets for transmission. In one embodiment, the communication stack passes the packets to device driver 232. Processor 102 executes the operations of the programs of system 200 residing in memory 103.

Device driver 232 is a program associated with a hardware device. For example, device driver 232 may be a NIC driver. In one embodiment, device driver 232 is a single entity driving a hardware device. In an alternate embodiment, device driver 232 is a layered driver implementation, where multiple components conjoin to provide an interface between the hardware device and the system upper layers. A data packet received by device driver 232 from system upper layers is prepared for transmission and sent to NI 210. Likewise, a data packet received from network 220 by NI 210 is processed and device driver 232 indicates the packet to system upper layers. Device driver 232 manages and maintains SA table 234 and SA lookup table 235. Device driver 232 allocates the memory for SA table 234 and SA lookup table 235 and populates the tables.

In one embodiment, memory 103 contains SA table 234 and/or SA lookup table 235. SA table 234 is a data structure of SAs. Each SA contains multiple bytes of data. For example, an implementation could be used where the driver structure for each SA is about 250 bytes. A system upper layer passing an SA to the device driver indicates for each SA whether the SA is for transmit or receive traffic. In one embodiment, SA table 234 contains all SAs, both transmit and receive SAs. In an alternate embodiment, SA table 234 is split, containing a transmit SA table and a receive SA table.

SA lookup table 235 is a data structure containing information to match a data packet with its corresponding SA. In one embodiment, two elements are used to match an SA to a data packet: a key value that identifies the SA, and an index or pointer to locate the memory location of the SA within SA table 234.

For example, OS 231 creates and passes a data packet to device driver 232 to be encrypted and transmitted to network 220. Device driver 232 uses a key value from the data packet, for example, the handle associated with the packet, to find an entry in SA lookup table 235. The entry in lookup table 235 contains an index with the memory location of the corresponding SA in SA table 234. In one embodiment, the key value is the handle on transmit and the SPI on receive.

Figure 3:
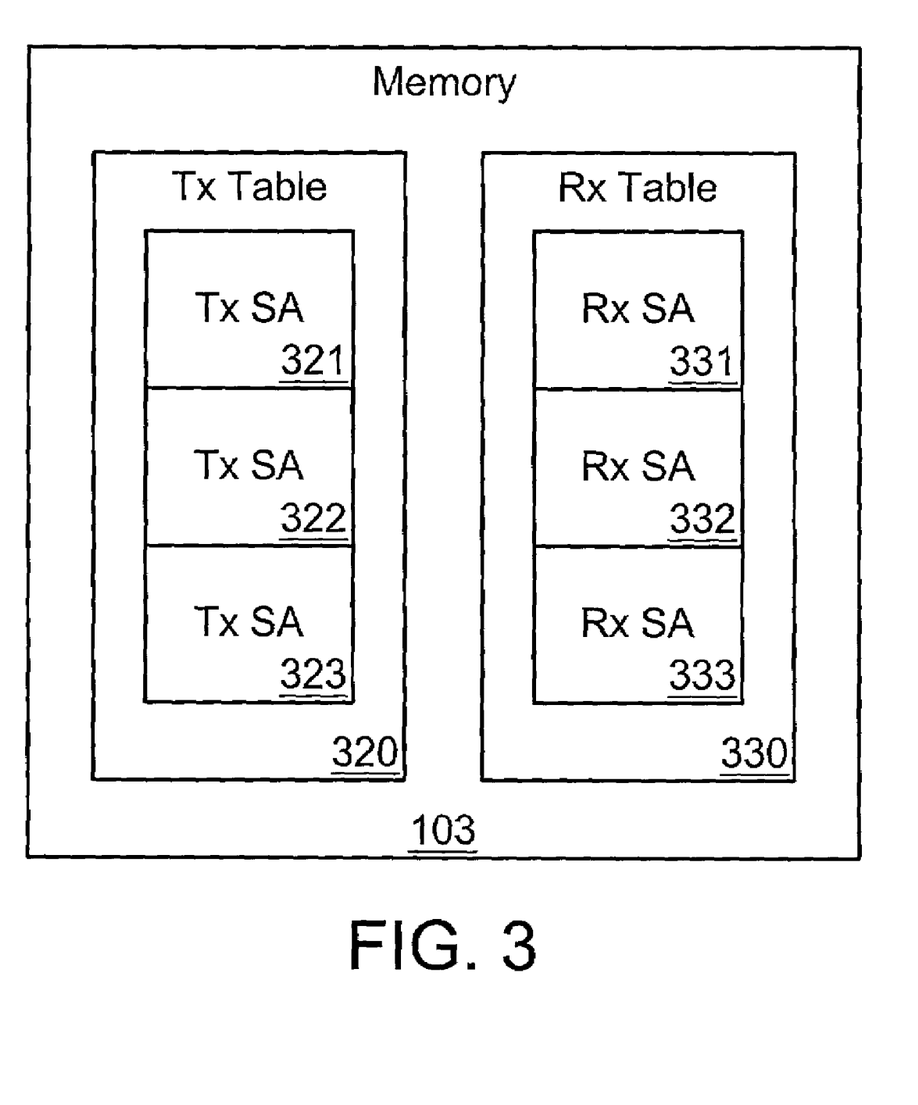
FIG. 3 is one embodiment of a block diagram of a memory that contains SA tables.

FIG. 3 is one embodiment of a block diagram of a memory that contains SA tables. In one embodiment, memory 103 contains Tx (transmit) table 320 and separate Rx (receive) table 330. Prior art uses only one SA table, where both transmit and receive SAs are stored together. In the traditional approach, when an SA is needed to apply crypto operations to a secure traffic data packet, the SA table is searched linearly for a match. This is inherently inefficient because transmit SAs will be searched for receive traffic and receive SAs will be searched for transmit traffic. There is no possibility of a match in either case.

Tx table 320 contains transmit SAs Tx SA 321, Tx SA 322, and Tx SA 323. Similarly, Rx table 330 contains receive SAs Rx SA 331, Rx SA 332, and Rx SA 333. System upper layers indicate to the device driver which SAs correspond to data packets for transmit traffic and which correspond to data packets for receive traffic. The device driver places the SAs in the tables accordingly. When the device driver receives a packet to be transmitted, the device driver searches Tx table 320. Likewise, when a packet is received from the network by the device driver, the device driver searches Rx table 330. This provides an advantage over the traditional approach because transmit SAs will not be searched for receive traffic, and receive SAs will not be searched for transmit traffic. Thus, if a traditional SA table contained 1024 entries, a linear search would result on average in N/2, or 512 comparisons to make a match. By separating the Tx SAs into Tx table 320 and Rx SAs into Rx table 330, the linear search would result in 256 comparisons on average.

Figure 4:
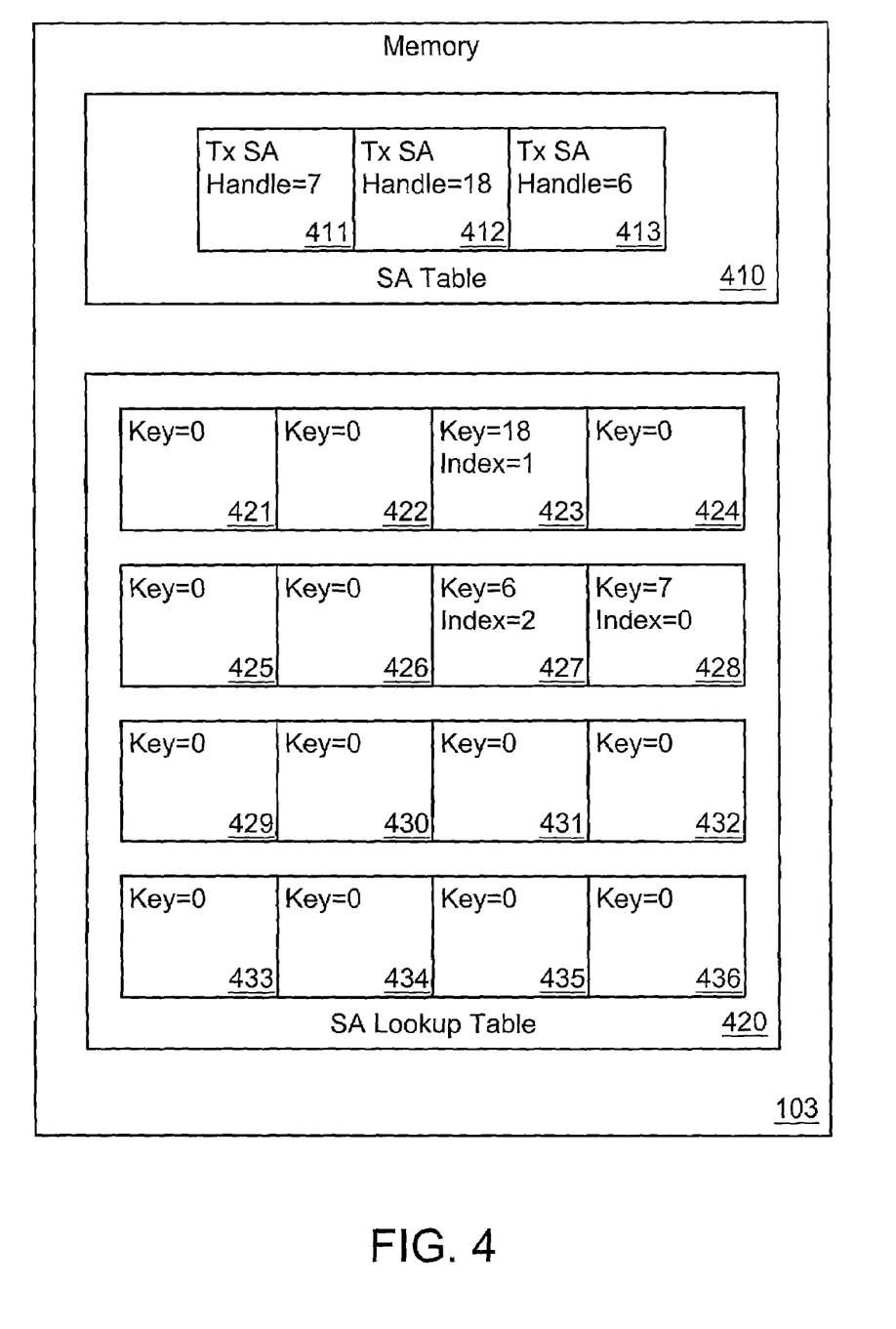
FIG. 4 is one embodiment of a block diagram of a memory containing an SA table and an SA lookup table.

FIG. 4 is one embodiment of a block diagram of a memory containing an SA table and an SA lookup table. Memory 103 contains SA table 410. In one embodiment, SA table 410 comprises a data structure of transmit SAs. Thus, SA table contains Tx SA 411, Tx SA 412, and Tx SA 413, which are data structures of crypto information necessary to apply crypto operations to data packets corresponding to the respective transmit SAs. In one embodiment, each transmit SA has a unique handle chosen by the device driver. The handle is a key value to uniquely identify the SA.

In an alternate embodiment, SA table 410 comprises a data structure of receive SAs. Thus, SA table 410 may contain, for example, entries Rx SA 411, Rx SA 412, and Rx SA 413. Each receive SA is a data structure of crypto information necessary to apply crypto operations to data packets corresponding to the respective receive SAs. Each receive SA has an SPI chosen by a random algorithm. The SPI is a key value to uniquely identify the SA. In one embodiment, SA table 410 may contain both transmit and receive SAs.

When other system layers pass a data packet to the device driver, the system layer indicates to the device driver whether the packet corresponds to a transmit or receive traffic stream. On transmit, a system upper layer creates the data packet, and passes the packet with its corresponding handle to the device driver. The system upper layer may be, for example, the TCP/IP stack in the OS. On receive, the packet is received by a network interface device and passed up to the device driver. The device driver obtains the SPI by parsing the data packet.

In one embodiment, after the key value is obtained for a packet associated with either a transmit or a receive data stream, the device driver obtains the corresponding SA. As mentioned previously, a traditional approach to obtain the SA is to perform a linear search on the SA table. Splitting the SA table into separate transmit and receive SA tables as described above will improve such a linear search. However, other reductions in search time can be made by considering the environment in which the device driver is to operate.

Because the SA handle is chosen by the device driver to be unique, it can identify the SA on transmit. Likewise, when the SPI is guaranteed by the OS to be unique, for example, in OSs available from Microsoft Corporation, it can identify the SA on receive. Ordering the SAs in tables by the handle for the transmit SA table and by the SPI for the receive SA table allows use of a binary search algorithm. If each SA table contained, for example, 1024 entries, a linear search would require on average 512 comparisons, resulting in O(n) performance. A binary search would require on average 10 comparisons, resulting in O(log(n)) performance.

A hash function could be used to further reduce the search time. A hash table search only requires one comparison to locate a table entry, resulting in O(1) performance. However, for a hash table search to be highly efficient, the table should be no more than one-fifth full. Thus, in one embodiment, the device driver should allocate five times as much memory as required to store the number of SAs the driver is configured to support. If, for example, 2048 SA are to be supported, and the driver structure for each SA is about 250 bytes, the device driver should allocate 2.56 Mbytes of memory to maintain the efficiency gained by using a hash table search.

To reduce the amount of memory required, separate SA lookup tables can be used. By keeping the lookup table entries small, the resulting memory use for the lookup table will be relatively small. However, adding additional tables results in extra overhead making SA management less efficient for certain operations, for example, adding SAs, removing SAs, or changing SA information. Another consideration is that a search of the SA tables will be performed for every packet, whereas adding SAs, removing SAs, and changing SA information will occur relatively infrequently, perhaps once for every 100,000 searches performed. The savings in search time outweighs the performance loss due to the overhead costs of adding the SA lookup tables. Thus, the added overhead costs are small compared to the run-time performance improvements gained in search algorithm efficiency.

Another consideration is the choice of hash function. Performance could be improved if a hash function were chosen that had a very low cost in terms of processor cycles, for example, a bit-wise AND. Generally, a bit-wise AND is not a good choice of hash function. However, in the case where the SA key value is a unique identifier for each SA, the bit-wise AND can be used with some minor modifications to the techniques described so far. To make the bit-wise AND function work, the lookup tables should be a whole binary number ($2^N$, where N is an integer). Thus, the hash function comprises a mask of value ($2^N-1$)). For example, if an SA lookup table contains 1024 entries ($2^{10}$), the hash function would be 1023 ($2^{10}-1$). Therefore, the device driver should not support more than 204 ($2^{10}/5$) SAs in this example.

In one embodiment, memory 103 contains SA lookup table 420. The size of SA lookup table 420 depends on the number of SAs supported by the device driver associated with the electronic system containing memory 103 of FIG. 4. For example, if the device driver were configured to support the three SAs of SA table 410, SA lookup table 420 should have at least fifteen (3*5) entries to enable efficient use of a hash table search. However, to support a bit-wise AND hash function, SA lookup table 420 should be a whole binary number. Thus, the number of entries in SA lookup table 420 is chosen to be the lowest whole binary number greater than five times the number of SAs supported. In this case, sixteen ($2^4$) is selected because it is the lowest whole binary number greater than five times three.

The sixteen entries of SA lookup table 420 are labeled 421-436. In one embodiment, each entry has two possible fields of information. They are a key value and an index. The key value of the SA lookup table entry is compared to the hash key value of the SA sought. The index is a pointer or an index to the location of the SA in SA table 410. In one embodiment, a key value of zero signifies that there is no valid information in the entry to locate the SA sought. A 2-byte index value could support up to 64K connections. If more connections were supported, a larger index would be used. In one embodiment, a pointer to the SA is used, with a 4-byte value for a 32-bit environment, and an 8-byte value for a 64-bit environment.

In one embodiment, the handle corresponding to a transmit data packet is hashed to produce a hash key value. That hash key value is then used to index the location of the entry in SA lookup table 420 that will direct the device driver to the location in SA table 410 corresponding to the SA for the transmit data packet. For example, if a transmit data packet had a handle value 18, the binary representation of it handle would be 10010. Hashing the handle with the mask 01111 ($2^4-1$) returns the hash key value of 00010, corresponding to the second entry, entry 423, in SA lookup table 420. The key value of entry 423 (key=18) is compared to the handle of the data packet (handle=18) and a match occurs.

Entry 423 has an index of value 1, directing the device driver to the first entry, entry 412, of SA table 410. The SA stored in entry 412 of SA table 410 can be obtained and used to apply crypto operations to the transmit data packet. In a similar fashion, a handle of value 7 would direct the device driver to the zeroeth entry, entry 411, of SA table 410, and a handle of value 6 would direct the device driver to the second entry, entry 413, of SA table 410. A similar process would be used for a receive SA table and receive SA lookup table for receive data packets.

In one embodiment, the SA handle is not chosen by the device driver. In this case, there is the possibility of collisions. In one embodiment, the SPI is chosen by a random number generator. In this case, collisions may occur, but using a hash function other than a bit-wise AND will not decrease the number of collisions. Thus, the case of collision in the hash table should be considered. The collision case can be used as the default search processing algorithm to maintain consistency in code across different environments, even in cases where collisions will not occur.

An example of a collision may be if a transmit SA had the handle value 2. Applying the hash mask 01111 to the handle would result in 00010 as the hash key value, causing it to collide with the hash key value of Tx SA 412 of FIG. 4. In one embodiment, SA lookup table 420 additionally contains a counter to indicate the number of SAs whose key hash collided with the entry. In this case, a separate table of known collided SAs is kept. In one embodiment, the separate collision table is ordered according to the key value (the handle for transmit SAs and the SPI for receive SAs) and searched with a binary search algorithm when a collision occurs.

Figure 5:
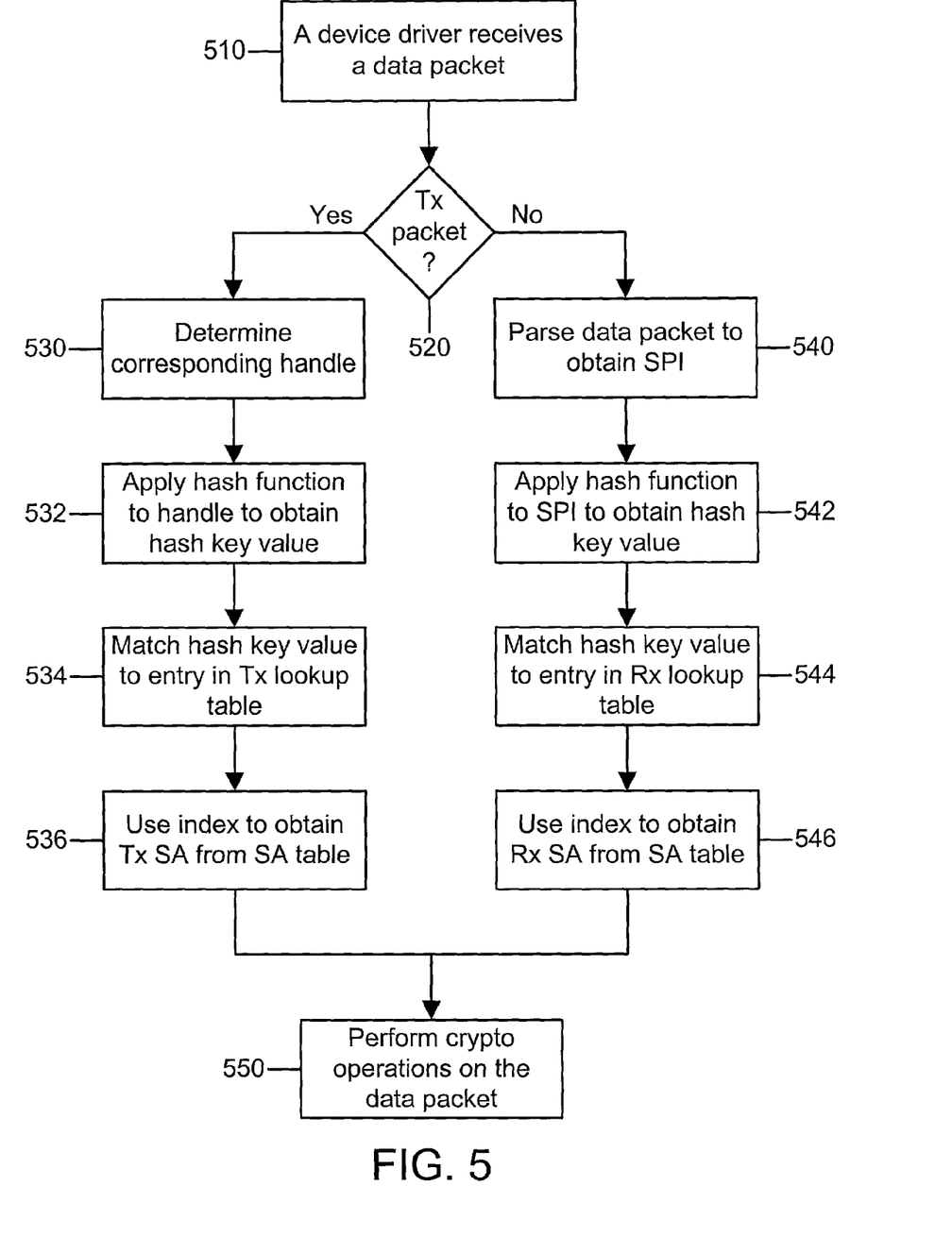
FIG. 5 is one embodiment of a flow diagram of a device driver handling a network data packet.

FIG. 5 is one embodiment of a flow diagram of a device driver handling a network data packet. A device driver receives a network data packet, 510. In one embodiment, a data packet is received by the device driver from the OS communication stack. The packet may also be received from another upper system layer. A data packet received from upper system layers is a transmit packet. In another embodiment, a data packet is received by the device driver from a network interface device. The packet may also come from another lower system layer. A data packet received from lower system layers is a receive packet. The data packet depicted is one which is to be processed with hardware offload.

The device driver determines whether the packet is a transmit or receive packet, 520. For example, a data packet can be identified as a transmit packet because it is received from other system layers. Likewise, a data packet can be identified as a receive packet because it is received from a network interface device. If the packet is a transmit packet, the device driver determines what handle corresponds to the SA associated with the data packet, 530. The handle is the key value for the SA on transmit because it is a unique identifier for the SA. The device driver applies the hash function to the handle to obtain a hash key value, 532. For example, if a unique handle is used to identify the SA and the hash table has a whole binary number ($2^N$, where N is an integer) of entries, a bit-wise AND could be used as a hash function. A bit-wise AND would operate as a mod if the mask were ($2^N-1$), but would only cost one processor instruction cycle as compared to multiple cycles for a traditional mod function.

The device driver uses the hash key value to find an entry in the transmit SA lookup table, 534. The hash key value is an index to a table entry. In one embodiment, the SA lookup table entry contains two fields of information: the SA key value and the SA location index. The device driver compares the SA key value of the data packet with the SA key value stored in the SA lookup table entry. The key value is the SA handle. If a match occurs, the SA lookup table entry corresponds to the SA for the data packet. In one embodiment, the SA lookup table entry contains another field of information: a counter indicating how many other hash key values have collided with the entry. In this case, a search can be made of a separate collision table to find the information for the corresponding SA.

The information in the SA lookup table is used to obtain the SA from the SA table, 536. The entry in the lookup table has a field of data indicating the location of the actual SA to the device driver. This can be, for example, a pointer or an index to the memory location of the SA within an SA table. The actual SA in the SA table contains information necessary to offload the transmit packet.

If the packet is not a transmit packet, it is a receive packet, and the packet is parsed to obtain the SPI, 540. In one embodiment, the SPI is the key value for the receive packet because it will uniquely identify the SA. The SPI is one of three pieces of information that the IPsec standard sets forth as making a match between a data packet and its corresponding SA. The other two pieces of information are the destination IP address and the protocol type. In one embodiment, only the SPI is verified at this step in the processing of the data packet of matching the data packet to its corresponding SA, and the other pieces of information are verified at a later time.

The device driver applies the hash function to the SPI to obtain the hash key value, 542. The hash key value is an index for a receive SA lookup table entry. The device driver uses the hash key value to find an entry in the receive SA lookup table, 544. In one embodiment, the SA lookup table entry contains two fields of information: the SA key value and the SA location index. The device driver compares the SA key value of the data packet with the SA key value stored in the SA lookup table entry. The key value is the SPI. If a match occurs, the SA lookup table entry corresponds to the SA for the data packet. In one embodiment, the SA lookup table entry contains another field of information: a counter indicating how many other hash key values have collided with the entry. In this case, a search can be made of a separate collision table to find the information for the corresponding SA.

The information in the SA lookup table is used to obtain the SA from the SA table, 546. The entry in the lookup table has a field of data indicating the location of the actual SA to the device driver. This can be, for example, a pointer or an index to the memory location of the SA within an SA table. The actual SA in the SA table contains information necessary to offload the receive packet.

The SA obtained from the SA table and used to perform crypto operations on the data packet, 550. A data packet for transmit traffic is processed using the SA information, and then the packet is transmitted. The processing comprises inline encrypting of the packet prior to transmission. A data packet for receive traffic is offloaded using the SA information, and then the packet is sent up the communications stack in the electronic system. The processing comprises authenticating and/or decrypting the data packet received from the network.

Figure 6:
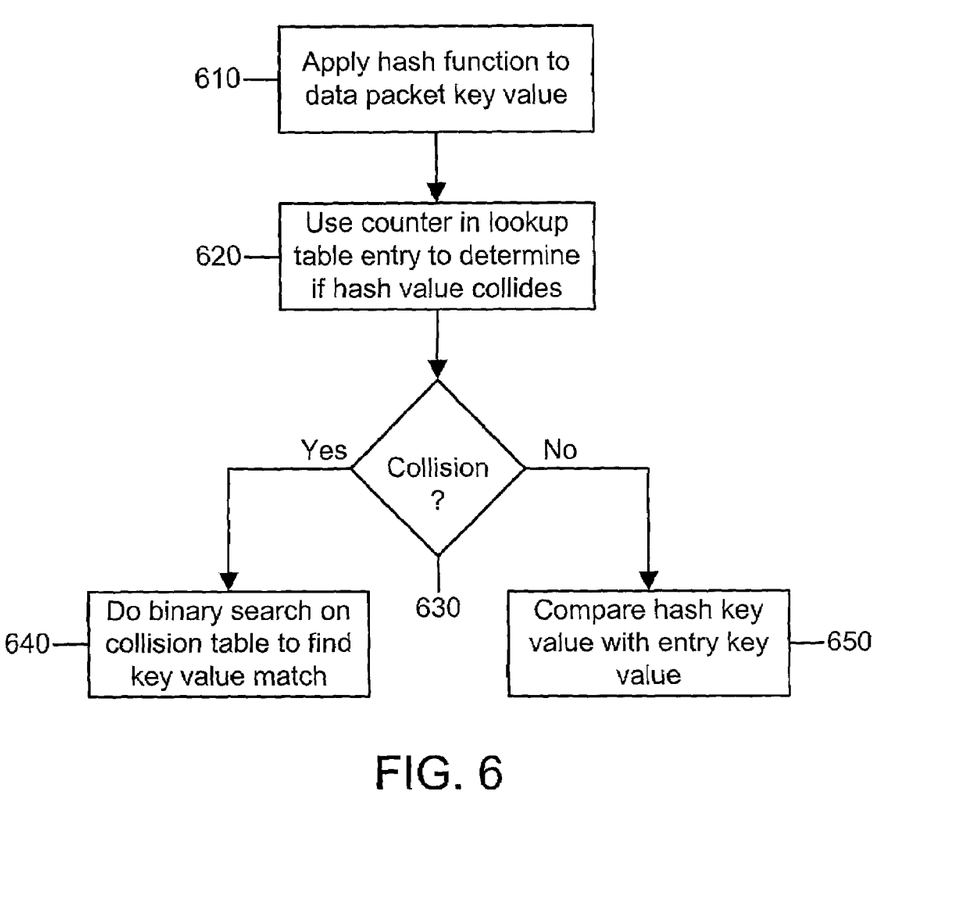
FIG. 6 is one embodiment of a flow diagram of a hash table search that handles collisions.

FIG. 6 is one embodiment of a flow diagram of a hash table search that handles collisions. In one embodiment of a hash table search according to FIG. 5, a hash function is applied to a data packet key value, 610. In one embodiment, the key value is the handle on transmit and the SPI on receive, which uniquely identify the SA corresponding to the data packet.

The resulting hash key value is an index into an SA lookup table. Each entry in the lookup table contains three fields of information: an SA key value, an SA memory location index, and a counter. The SA key value and the SA memory location index have been previously described herein.

The counter is used to determine if a hash key value collides with another entry, 620. The counter indicates how many SA key values have collided to the particular SA lookup table entry. For example, suppose the entry belonged to a lookup table with sixteen possible entries, 0-15. Suppose further that a bit-wise AND of value 001111 were used as the hash function. If the entry were the second entry in the lookup table, its index could be represented in binary form as 000010. Applying the hash function to a handle of value 2 would result in a hash key value of 000010, hashing to the second entry. However, handles of value 18 (010010) and 34 (100010) would also hash to the second entry, causing a collision. The counter would indicate that three different handles hashed to the same entry. In one embodiment, a counter value of zero indicates that there is no collision, and a value higher indicates the number of entries that have collided to that entry.

It is determined whether the hash key value collides with another entry, 630. If there is a collision, a binary search is performed on a collision table to match the data packet key value to the corresponding SA, 640. In one embodiment, when there is a collision with a particular entry in the SA lookup table, the colliding entry is added to a table separate from the SA lookup table and the SA table. The separate table is a collision table which contains SA lookup table entries whose key value hashed to the same lookup table entry as the key value of another SA. In one embodiment, this table is organized by the key value, the handle for transmit SAs and the SPI for receive SAs. Organizing the table by the key value allows a binary search to be performed on the collision table. If there is no collision, the hash key value is compared with the key value field of the SA lookup table entry, 650.

What is claimed is:

1. A method comprising:
receiving at a device driver a network packet having a corresponding security association (SA);
determining if the packet is an ingress packet or an egress packet;
determining for the packet a key value corresponding to the SA;
if the packet is an ingress packet, hashing the key value to determine a location of an entry in an ingress lookup table, and if the packet is an egress packet, hashing the key value to determine a location of an entry in an egress lookup table, the entry in the ingress lookup table and the entry in the egress lookup table containing information corresponding to the SA, the ingress lookup table being a separate lookup table from the egress lookup table;
retrieving from the entry an index to a location of the SA in memory; and
retrieving the SA from memory based on the index.

2. The method of claim 1 wherein receiving the network packet comprises the device driver being passed an egress packet from an electronic system operating system.

3. The method of claim 1 wherein receiving the network packet comprises the device driver being passed an ingress packet from a network interface device.

4. The method of claim 1 wherein the key value is a handle created for the SA for an egress packet.

5. The method of claim 1 wherein the key value is a security parameter index (SPI) extracted from the packet for an ingress packet.

6. The method of claim 1 wherein the lookup table entry comprises the key value and the index.

7. The method of claim 6 wherein the lookup table entry further comprises a counter to track collisions for the entry.

8. The method of claim 1 further comprising the location in memory of an SA corresponding to egress traffic being in a first table, and the location in memory of an SA corresponding to ingress traffic being in a second table, the tables being separate tables in memory.

9. The method of claim 1 further comprising supporting a number of network traffic streams, wherein the lookup table has $2^N$ entries, where N is an integer, $2^N$ being the lowest binary number greater than five times the number of network traffic streams supported.

10. The method of claim 1 wherein hashing the key value comprises using a bit-wise AND hash function with a mask of value $2^N-1$, where N is an integer, wherein the hash table contains $2^N$ entries.

11. An article comprising a machine-accessible storage medium to provide content to cause one or more electronic systems to:
receive at a device driver a network packet having a corresponding security association (SA);
determine if the packet is an ingress packet or an egress packet;
determine for the packet a key value corresponding to the SA;
if the packet is an ingress packet, hash the key value to determine a location of an entry in an ingress lookup table, and if the packet is an egress packet, hash the key value to determine a location of an entry in an egress lookup table, the entry in the ingress lookup table and the entry in the egress lookup table containing information corresponding to the SA, the ingress lookup table being a separate lookup table from the egress lookup table;
retrieve from the entry an index to a location of the SA in memory; and
retrieve the SA from memory based on the index.

12. The article of claim 11 wherein to receive the network packet comprises the device driver to be passed an egress packet from an electronic system operating system.

13. The article of claim 11 wherein to receive the network packet comprises the device driver to be passed an ingress packet from a network interface device.

14. The article of claim 11 wherein the key value is a handle created for the SA for an egress packet.

15. The article of claim 11 wherein the key value is a security parameter index (SPI) extracted from the packet for an ingress packet.

16. The article of claim 11 wherein the lookup table entry comprises the key value and the index.

17. The article of claim 16 wherein the lookup table entry further comprises a counter to track collisions for the entry.

18. The article of claim 11 further comprising the location in memory of an SA corresponding to egress traffic being in a first table, and the location in memory of an SA corresponding to ingress traffic being in a second table, the tables being separate tables in memory.

19. The article of claim 11 further comprising to support a number of network traffic streams, wherein the lookup table has $2^N$ entries, where N is an integer, $2^N$ being the lowest binary number greater than five times the number of network traffic streams supported.

20. The article of claim 11 wherein to hash the key value comprises using a bit-wise AND hash function with a mask of value $2^N$, where N is an integer, wherein the hash table contains $2^N$ entries.

21. An electronic system comprising:

one or more processors;

a network interface coupled with the one or more processors to provide a communications path between the electronic system and a network, the network interface to have a corresponding device driver to be executed on one or more of the processors; and a memory coupled with the one or more processors, the memory to have a program to provide instructions for the electronic system to receive at the device driver a network packet having a corresponding security association (SA), the program to determine if the packet is an ingress packet or an egress packet, to determine for the packet a key value corresponding to the SA, and if the packet is an ingress packet, hash the key value to determine a location of an entry in an ingress lookup table, and if the packet is an egress packet, hash the key value to determine a location of an entry in an egress lookup table, the entry in the ingress lookup table and the entry in the egress lookup table containing information corresponding to the SA, the ingress lookup table being a separate lookup table from the egress lookup table, to retrieve from the entry an index to a location of the SA in memory, and to retrieve the SA from memory based on the index.

22. The electronic system of claim 21 wherein the program to receive the network packet comprises the device driver to be passed an egress packet from an operating system.

23. The electronic system of claim 21 wherein the program to receive the network packet comprises the device driver to be passed an ingress packet from the network interface.

24. The electronic system of claim 21 wherein the key value is a handle created for the SA for an egress packet.

25. The electronic system of claim 21 wherein the key value is a security parameter index (SPI) extracted from the packet for an ingress packet.

26. The electronic system of claim 21 wherein the lookup table entry comprises the key value and the index.

27. The electronic system of claim 26 wherein the lookup table entry further comprises a counter to track collisions for the entry.

28. The electronic system of claim 21 further comprising the location in memory of an SA corresponding to egress traffic being in a first table, and the location in memory of an SA corresponding to ingress traffic being in a second table, the tables being separate tables in memory.

29. The electronic system of claim 21 further comprising the program to support a number of network traffic streams, wherein the lookup table has $2^N$ entries, where N is an integer, $2^N$ being the lowest binary number greater than five times the number of network traffic streams supported.

30. The electronic system of claim 21 wherein to hash the key value comprises using a bit-wise AND hash function with a mask of value $2^N-1$, where N is an integer, wherein the hash table contains $2^N$ entries.

* * * * *